C. BOLTSHAUSER.
ELECTRIC POCKET LAMP.
APPLICATION FILED OCT. 23, 1917.
1,327,017. Patented Jan. 6, 1920.
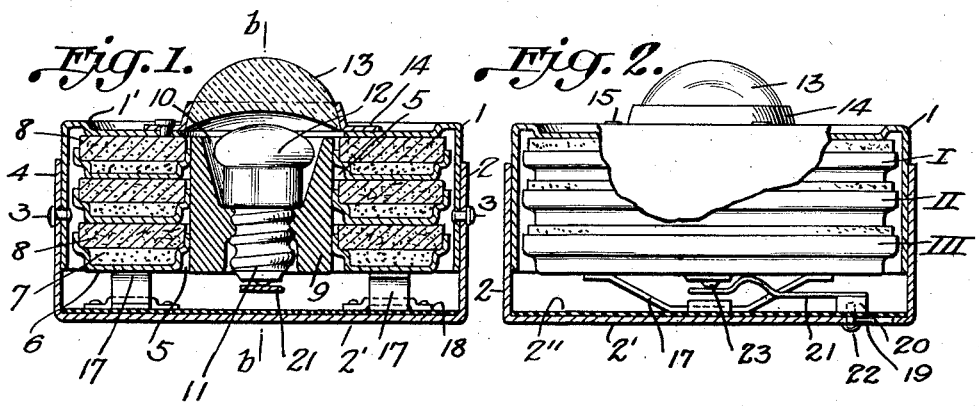
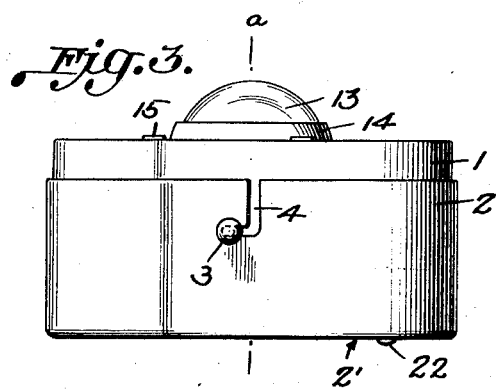
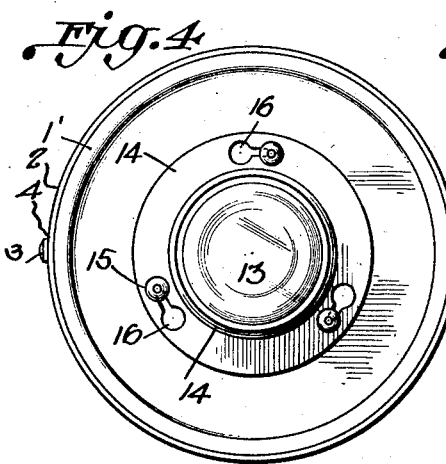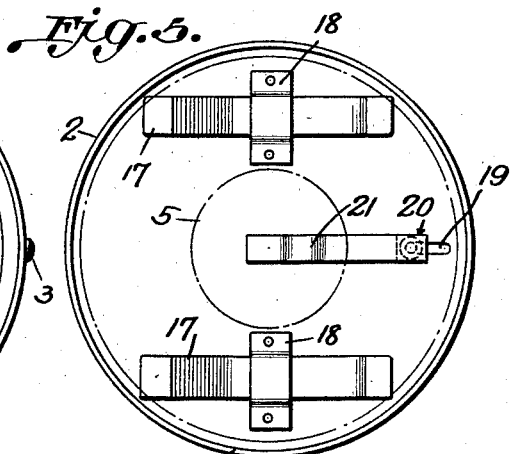
Witnesses
Paul Swold
[signature]
Inventor:
Conrad Boltshauser
By J. W. Horschel
Atty.

UNITED STATES PATENT OFFICE.

CONRAD BOLTSHAUSER, OF ZURICH, SWITZERLAND, ASSIGNOR TO COMPANY PHOEBUS, E. G., OF ZURICH, SWITZERLAND, A SWISS COMPANY.

ELECTRIC POCKET-LAMP.

1,327,017.　　　　　Specification of Letters Patent.　　Patented Jan. 6, 1920.

Application filed October 23, 1917. Serial No. 198,068.

*To all whom it may concern:*

Be it known that I, CONRAD BOLTSHAUSER, a citizen of the Swiss Confederation, residing at Zurich, Switzerland, have invented a new and useful Electric Pocket-Lamp, of which the following is a specification.

This invention relates to electric pocket-lamps in a circular casing with centrally disposed countersunk bulb, in combination with an internal battery of loosely superposed couples of flat and equally sized annuli, and insulated springs fast in the casing to form contact and press said couples against the top wall of the casing.

The annexed drawing illustrates my invention by way of example.

Figure 1 is a vertical section on line *a—a* of Fig. 3; Fig. 2, a sectional elevation on line *b—b* of Fig. 1; Fig. 3, an elevation; Fig. 4 a plan of Fig. 1; and, Fig. 5, an internal view of the cover of the casing.

The pocket lamp here shown has a circular box-shaped casing 1 of metal and box-cover 2 secured by bayonet locks 3 and 4 of two oppositely placed studs 3 fixed to part 1, and two corresponding slots 4 in part 2, see Fig. 3. In the casing 1 is lodged a battery of three superposed elements I, II, III, indicated by dots and dashes in Fig. 5, which form a central chamber 5. Each couple consists of a dished zinc electrode 6 containing pasty electrolyte 7 insulated from the zinc. The carbon electrode 8 rests on the electrolyte but is insulated from the zinc. Adjacent couples are in contact zinc to carbon. The carbon electrode 8 of couple I is in touch with the inner face of the top wall 1′ of the casing 1, while the zinc electrode is isolated *i. e.* everywhere separated from the casing 1. In the space 5 of the battery an insulating hollow plug 9, of wood for example, is inserted which has a central bore enlarged at the upper portion and formed with a short screw-thread at its portion nearest the enlargement. The center of the top wall 1′ is provided with a funnel-shaped attachment 10 which is seated in the enlargement of the plug 9 and has a screw-threaded portion to engage in the threads of said plug and also to receive the screw-threaded mounting 11 of the lamp 12. The latter is in electrical contact, through the funnel 10 and wall 1′, with the electrode 8 of the couple I. The aperture above the funnel 10 in the wall 1′ is covered by a lens or bull's-eye 13 retained in a mounting 14 which is removably secured to the outside of the wall 1′. Three equidistant studs 15 (Fig. 4), suitably centered, are fixed on the wall 1′ so as to engage correspondingly disposed bayonet slots 16 in the mounting 14. To the inner face 2′ of the box-cover 2, provided with an insulating plate 2″, there are secured two spring-blades 17 which press against the couple III and keep the three couples in contact with each other. The springs 17 are held in position by insulating straps 18, for example of leather, fixed to the wall 2′ of cover 2. Between the said springs, and moving in a radial slot 19 in the wall 2′ and plate 2″ of the cover 2, there is a slider 20 of insulating material fitted with a metal arm 21 whose end portion, fixed to the slider, bears against the zinc electrode 6 of couple III and serves as a make and break contact for the lamp according to the forward or rearward position of the slider 20. Operation of the sliding contact is effected externally by means of a knob 22 on the wall 2′. Figs. 2 and 5 show the contact closed, the free end of arm 21 being in touch with the contact 23 of the lamp-mounting 11.

The battery of the pocket lamp may comprise more than three couples. If a fourth couple be desired, the box-cover 2 can have other slots 4 (in pairs) of different lengths so as to enable the box to be adjusted according to the length required. The contact arm 21 can be bent so as to meet the contact 23 which may be more or less distanced from the wall 2′.

I claim:

An electric pocketlamp having a circular casing with a centrally disposed countersunk bulb, in combination with an internal battery composed of loosely superposed couples of flat and equally sized annuli, and insulated springs fast in the casing to form contact and press the said couples against the top wall of the casing, and means for making electrical connection between the lamp and the battery.

CONRAD BOLTSHAUSER,